United States Patent
Gochkov et al.

(10) Patent No.: US 10,776,385 B2
(45) Date of Patent: Sep. 15, 2020

(54) METHODS AND APPARATUS FOR TRANSPARENT DATABASE SWITCHING USING MASTER-REPLICA HIGH AVAILABILITY SETUP IN RELATIONAL DATABASES

(71) Applicant: VMware, Inc., Palo Alto, CA (US)

(72) Inventors: Gospodin Gochkov, Sofia (BG); Miroslav Mitevski, Sofia (BG); Diana Kovacheva, Sofia (BG); Ivo Petkov, Sofia (BG); Zahari Ivanov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 157 days.

(21) Appl. No.: 15/368,286

(22) Filed: Dec. 2, 2016

(65) Prior Publication Data
US 2018/0157560 A1    Jun. 7, 2018

(51) Int. Cl.
*G06F 11/00* (2006.01)
*G06F 16/27* (2019.01)
(Continued)

(52) U.S. Cl.
CPC .......... *G06F 16/27* (2019.01); *G06F 11/2028* (2013.01); *G06F 11/2041* (2013.01);
(Continued)

(58) Field of Classification Search
CPC ............. G06F 11/1469; G06F 11/2023; G06F 11/2028; G06F 11/2041
See application file for complete search history.

(56) References Cited

U.S. PATENT DOCUMENTS 6,539,427 B1    3/2003    Natarajan et al.
7,213,246 B1 *  5/2007    van Rietschote ... G06F 11/1482
                                              707/999.202
(Continued)

FOREIGN PATENT DOCUMENTS

WO    2016024838    2/2016

OTHER PUBLICATIONS

United States Patent and Trademark Office, "Non-Final Office Action," issued in connection with U.S. Appl. No. 15/374,492, dated Jul. 27, 2018, 14 pages.
(Continued)

*Primary Examiner* — Philip Guyton
(74) *Attorney, Agent, or Firm* — Hanley, Flight & Zimmerman, LLC

(57) ABSTRACT

Methods, apparatus, and systems to perform transparent database switching using master-replica high availability setup in relational databases are disclosed. An example system includes a first virtual appliance including a first proxy and a master database, the first proxy to forward service traffic to the master database, the master database to read and/or write data based on the service traffic; a second virtual appliance including a second proxy and a first replica database, the second proxy to determine data stored in the master database, the first replica database to replicate the master database; and a third virtual appliance including a third proxy and a second replica database, the third proxy to, in response to determining the master database of the first virtual appliance is to power down, promote the second replica database to the master database.

30 Claims, 11 Drawing Sheets

(51) Int. Cl.
*G06F 16/23* (2019.01)
*G06F 11/20* (2006.01)

(52) U.S. Cl.
CPC ...... *G06F 11/2048* (2013.01); *G06F 16/2365* (2019.01); *G06F 16/2379* (2019.01); *G06F 2201/80* (2013.01); *G06F 2201/815* (2013.01)

(56) References Cited

U.S. PATENT DOCUMENTS

| | | | |
|---|---|---|---|
| 8,261,295 B1 | 9/2012 | Risbood et al. | |
| 8,805,978 B1 | 8/2014 | Anthonisamy et al. | |
| 8,880,690 B1 | 11/2014 | Kennedy et al. | |
| 8,881,129 B1 | 11/2014 | McKinnon et al. | |
| 9,128,627 B1* | 9/2015 | Bachu | G06F 11/1456 |
| 9,201,558 B1 | 12/2015 | Dingman et al. | |
| 9,460,028 B1 | 10/2016 | Raizen et al. | |
| 9,612,924 B1* | 4/2017 | Joseph | G06F 11/2007 |
| 9,882,855 B1 | 1/2018 | Twitchell et al. | |
| 9,979,609 B2 | 5/2018 | Kurabayashi | |
| 10,009,432 B1 | 6/2018 | Tang et al. | |
| 10,055,311 B1 | 8/2018 | Troyan et al. | |
| 10,079,877 B2 | 9/2018 | Paramasivam | |
| 10,148,493 B1 | 12/2018 | Ennis, Jr. et al. | |
| 10,165,036 B1 | 12/2018 | Gigliotti | |
| 10,169,035 B1 | 1/2019 | Caspi | |
| 10,205,701 B1 | 2/2019 | Voss et al. | |
| 10,212,034 B1 | 2/2019 | Carranza Giotto et al. | |
| 10,412,022 B1 | 9/2019 | Tang et al. | |
| 10,484,334 B1 | 11/2019 | Lee et al. | |
| 2002/0073236 A1 | 6/2002 | Helgeson et al. | |
| 2006/0010176 A1 | 1/2006 | Armington | |
| 2006/0021014 A1 | 1/2006 | Hartman et al. | |
| 2006/0106585 A1 | 5/2006 | Brown et al. | |
| 2008/0086564 A1 | 4/2008 | Putman et al. | |
| 2009/0019535 A1 | 1/2009 | Mishra et al. | |
| 2009/0119538 A1* | 5/2009 | Scales | G06F 11/14 714/6.13 |
| 2009/0204981 A1 | 8/2009 | Karino et al. | |
| 2009/0222815 A1* | 9/2009 | Dake | G06F 9/455 718/1 |
| 2010/0125844 A1 | 5/2010 | Mousseau et al. | |
| 2011/0010515 A1* | 1/2011 | Ranade | G06F 11/1451 711/162 |
| 2011/0107406 A1 | 5/2011 | Frost et al. | |
| 2012/0110574 A1 | 5/2012 | Kumar | |
| 2013/0091376 A1* | 4/2013 | Raspudic | G06F 11/1484 714/3 |
| 2013/0185716 A1* | 7/2013 | Yin | G06F 9/45558 718/1 |
| 2013/0204746 A1 | 8/2013 | Lee et al. | |
| 2013/0290531 A1 | 10/2013 | Azlin et al. | |
| 2013/0346803 A1* | 12/2013 | Chiruvolu | G06F 11/3688 714/37 |
| 2014/0059226 A1 | 2/2014 | Messerli et al. | |
| 2014/0108665 A1 | 4/2014 | Arora et al. | |
| 2014/0280961 A1 | 9/2014 | Martinez et al. | |
| 2014/0282889 A1 | 9/2014 | Ishaya et al. | |
| 2014/0283077 A1 | 9/2014 | Gallella et al. | |
| 2014/0298091 A1 | 10/2014 | Carlen et al. | |
| 2014/0304352 A1 | 10/2014 | Chaudhary et al. | |
| 2014/0304399 A1 | 10/2014 | Chaudhary et al. | |
| 2015/0058447 A1 | 2/2015 | Albisu | |
| 2015/0113142 A1 | 4/2015 | Adolph et al. | |
| 2015/0113533 A1 | 4/2015 | Hui et al. | |
| 2015/0135084 A1 | 5/2015 | Rosenberger | |
| 2015/0212834 A1 | 7/2015 | Lee et al. | |
| 2015/0293764 A1 | 10/2015 | Visvanathan | |
| 2015/0304233 A1 | 10/2015 | Krishnamurthy et al. | |
| 2015/0341421 A1 | 11/2015 | Chauhan | |
| 2016/0203202 A1* | 7/2016 | Merriman | G06F 11/1458 714/20 |
| 2017/0070536 A1 | 3/2017 | Mortman | |
| 2017/0161347 A1 | 6/2017 | Raza et al. | |
| 2017/0220431 A1* | 8/2017 | Joshi | G06F 11/2033 |
| 2017/0262519 A1* | 9/2017 | Horowitz | G06F 11/0709 |
| 2017/0272321 A1 | 9/2017 | Ramos da Rocha et al. | |
| 2017/0272335 A1 | 9/2017 | Hamlin et al. | |
| 2017/0329635 A1 | 11/2017 | Rathke | |
| 2017/0339013 A1 | 11/2017 | Allen | |
| 2017/0351536 A1 | 12/2017 | Kamalakantha et al. | |
| 2017/0366624 A1 | 12/2017 | Tsang et al. | |
| 2018/0157524 A1 | 6/2018 | Saxena et al. | |
| 2018/0191599 A1 | 7/2018 | Balasubramanian et al. | |
| 2019/0028355 A1 | 1/2019 | Subramanian et al. | |

OTHER PUBLICATIONS

United States Patent and Trademark Office, "Non-Final Office action," issued in connection with U.S. Appl. No. 15/374,492, dated Jul. 17, 2019, 22 pages.

United States Patent and Trademark Office, "Final Office action," issued in connection with U.S. Appl. No. 15/374,492, dated Apr. 5, 2019, 22 pages.

United States Patent and Trademark Office, "Advisory Action", issued in connection with U.S. Appl. No. 15/374,492, dated Jan. 31, 2020, (3 pages).

United States Patent and Trademark Office, "Non-Final Office Action", issued in connection with U.S. Appl. No. 15/374,492, dated Mar. 27, 2020, (12 pages).

United States Patent and Trademark Office, "Final Office Action", issued in connection with U.S. Appl. No. 15/374,492, dated Nov. 21, 2019, (12 pages).

United States Patent and Trademark Office, "Notice of Allowance", issued in connection with U.S. Appl. No. 15/374,492, dated Jul. 29, 2020, (8 pages).

* cited by examiner

US 10,776,385 B2

METHODS AND APPARATUS FOR TRANSPARENT DATABASE SWITCHING USING MASTER-REPLICA HIGH AVAILABILITY SETUP IN RELATIONAL DATABASES

FIELD OF THE DISCLOSURE

The present disclosure relates generally to cloud computing and, more particularly, to methods and apparatus to perform transparent database switching using master-replica high availability setup in relational databases.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on significant manual user input and configuration to install, configure, and deploy the components of the cloud computing environment.

DETAILED DESCRIPTION

Figure 1:
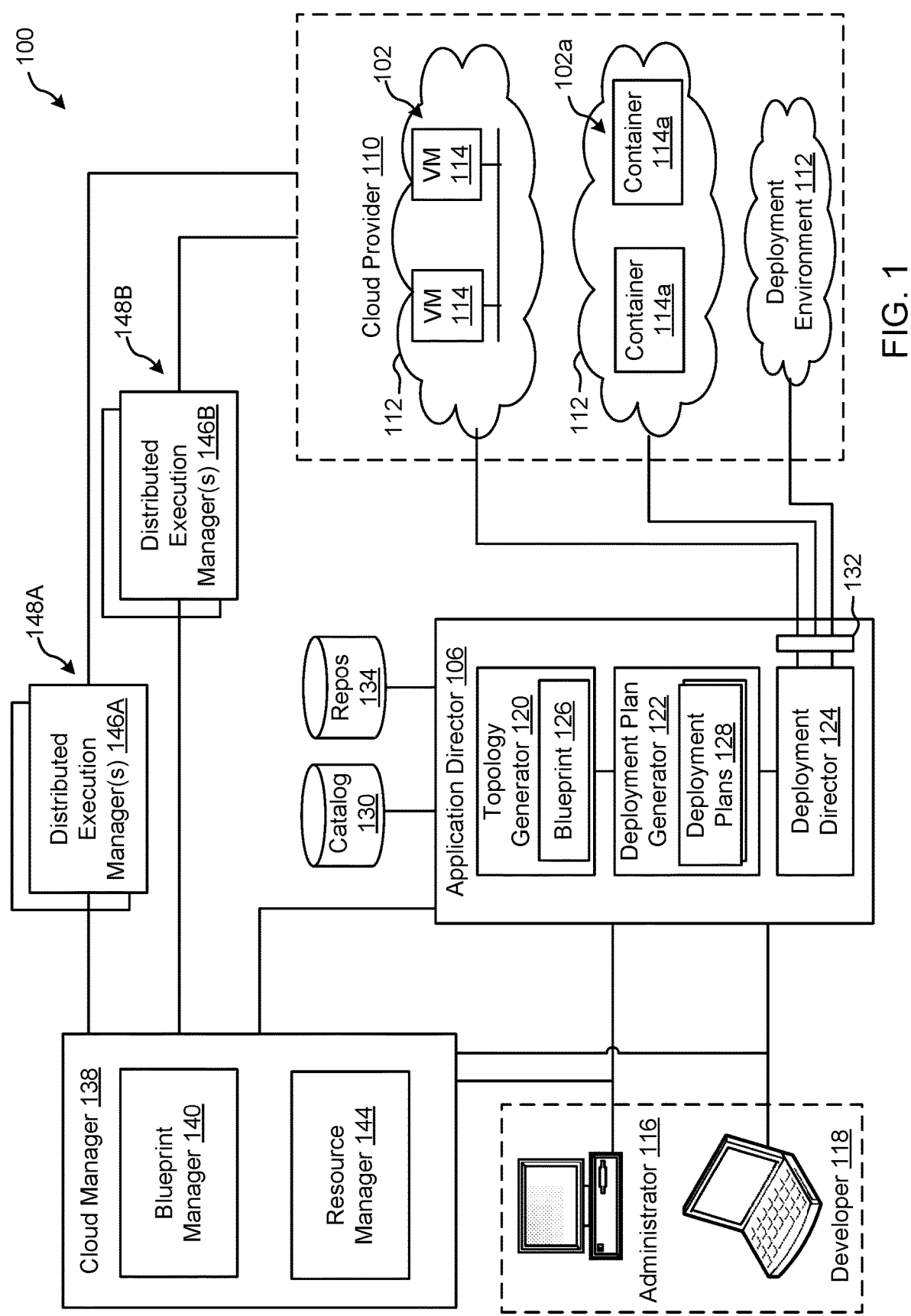
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. Patent Application Publication No. 2008/0244579, entitled "METHOD AND SYSTEM FOR MANAGING VIRTUAL AND REAL MACHINES," filed Sep. 21, 2007, and granted as U.S. Pat. No. 8,171,485, U.S. Patent Application Publication No. 2012/0240114, entitled "METHOD AND SYSTEM FOR MANAGING VIRTUAL AND REAL MACHINES," filed Mar. 26, 2007, and granted as U.S. Pat. No. 8,826,289, U.S. Patent Application No. 2014-0181816, entitled "METHODS AND APPARATUS TO MANAGE VIRTUAL MACHINES," filed Dec. 12, 2013, U.S. Patent Application No. 2014-0181817, entitled "METHODS AND APPARATUS TO MANAGE EXECUTION OF VIRTUAL MACHINE WORKFLOWS," filed Dec. 12, 2013, and U.S. Patent Application No. 2014-0165060, entitled "METHODS AND APPARATUS TO RECLAIM RESOURCES IN VIRTUAL COMPUTING ENVIRONMENTS," filed Dec. 12, 2013, all five of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is often referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device, etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
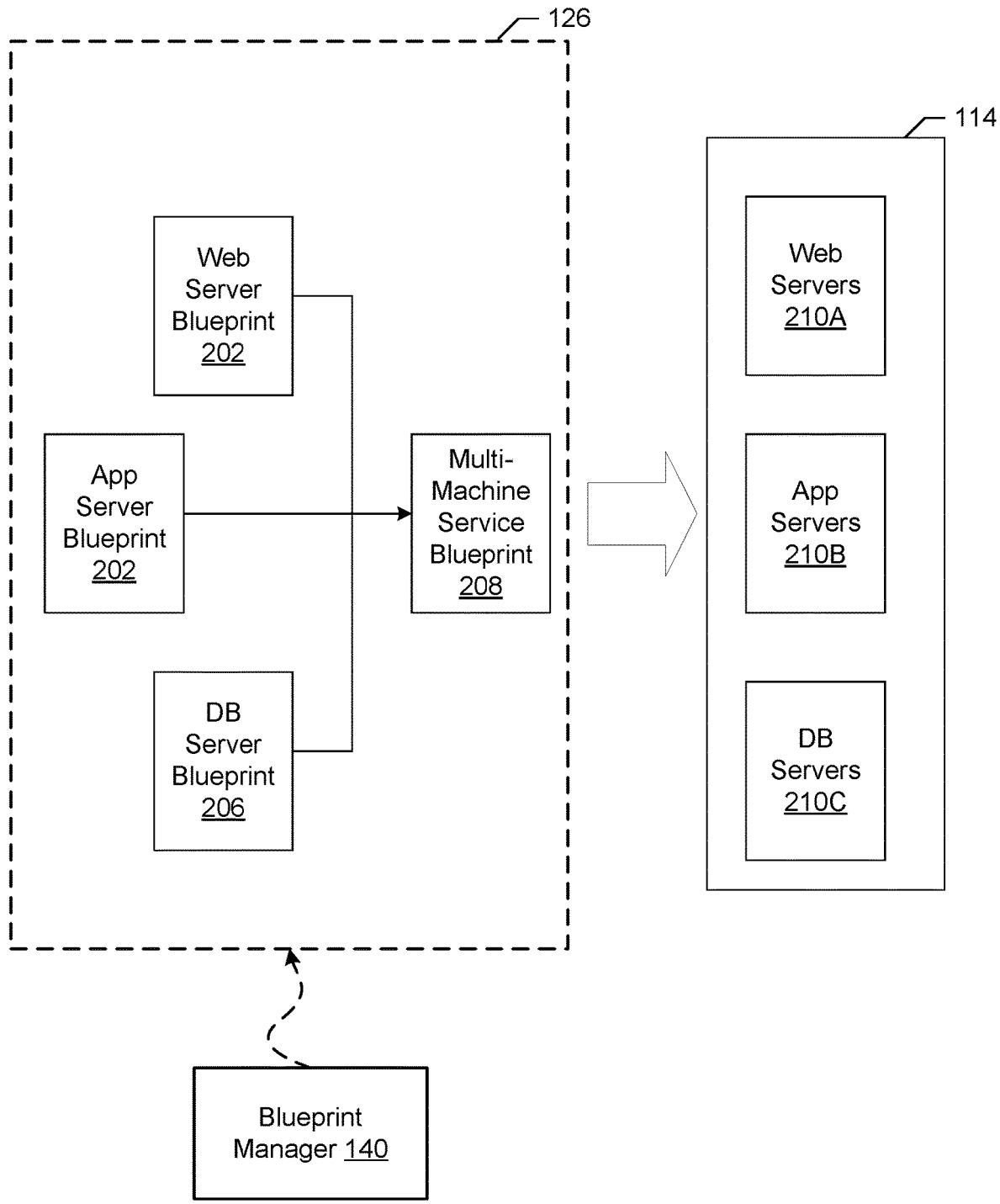
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
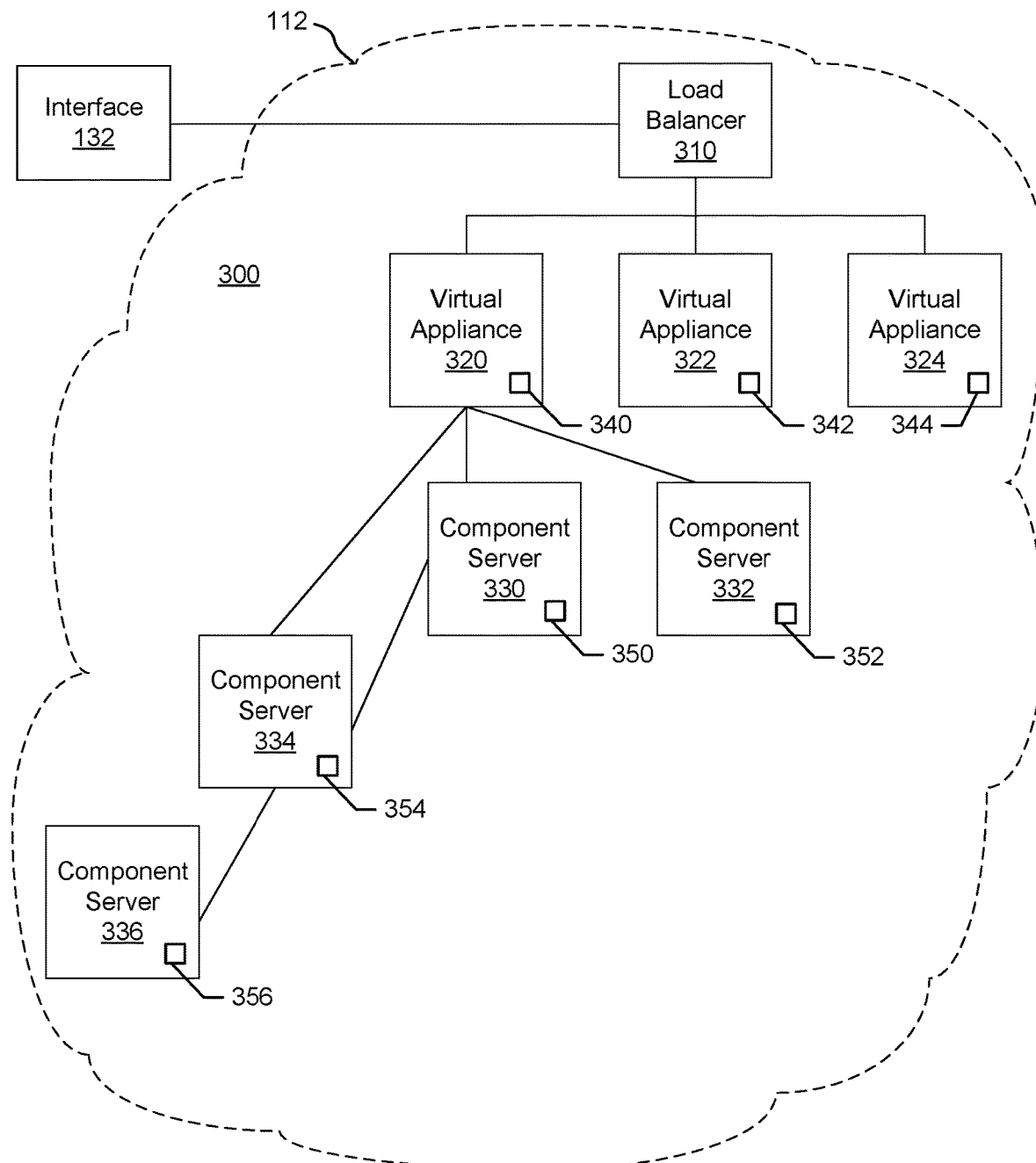
FIG. 3 is a block diagram of an example installation of deployed virtual machines and associated servers acting as hosts for deployment of component servers for a customer.

FIG. 3 is a block diagram of an example installation of deployed appliances or virtual appliances (VAs) (e.g., VMs 114 and/or containers 114*a*) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a cluster of vAs 320, 322, 324. Each VA 320-324 is a deployed VM 114 and/or container 114*a*. In this example, the VA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from the example component server 330 rather than (or in addition to) directly from the virtual appliance 320, although the VA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each VA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the VA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114*a* that is managed through the installation 300. To the user, he or she is working on a single machine, but behind the scenes, the virtual appliance (VA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
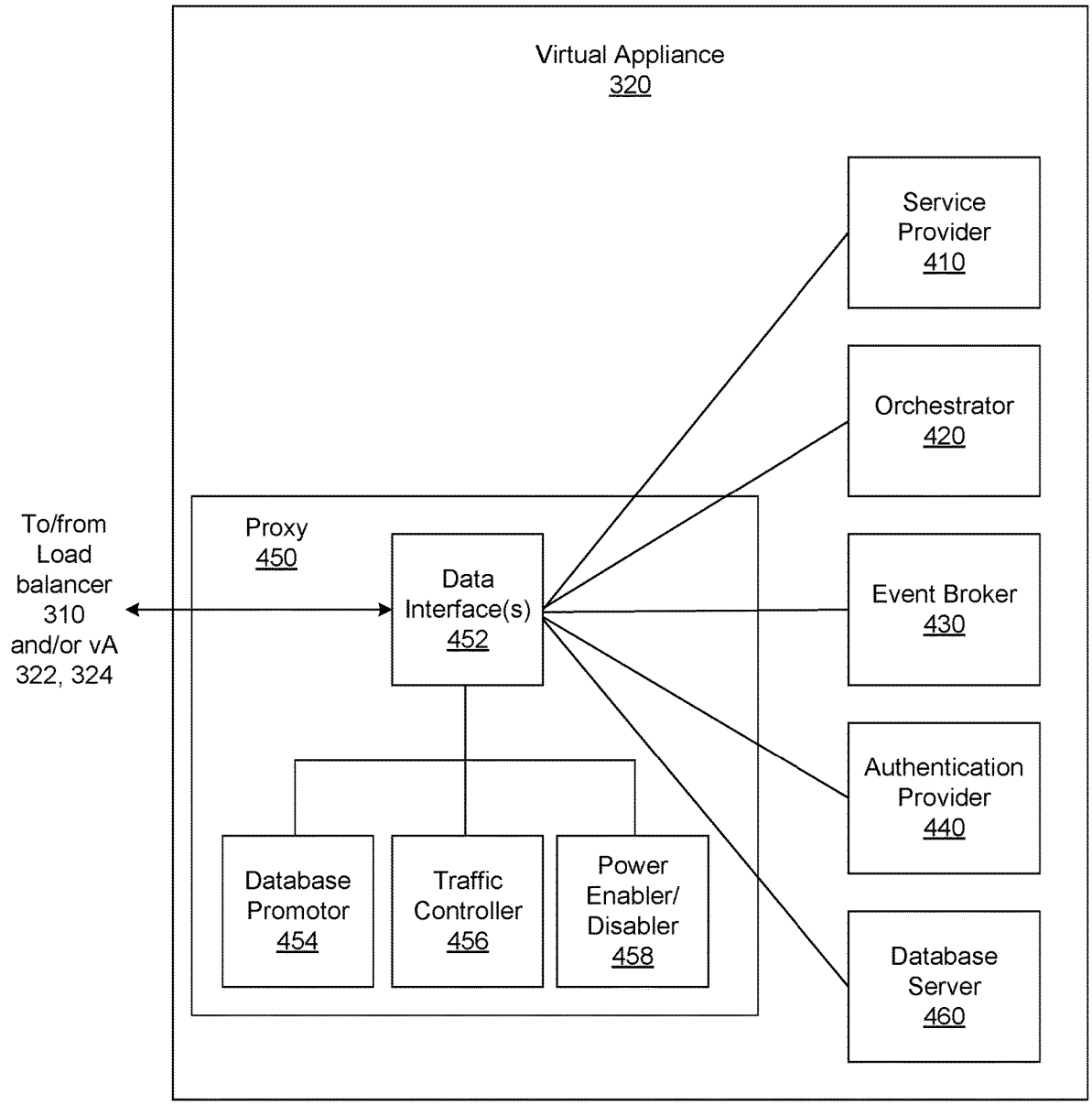
FIG. 4 is a block diagram of an example implementation of a virtual appliance.

FIG. 4 is a block diagram of an example implementation of the VA 320. In the example of FIG. 4, the VA 320 includes a service provider 410, an orchestrator 420, an event broker 430, an authentication provider 440, an internal reverse proxy (e.g., herein referred to as proxy) 450, and a database server 460. The example proxy 450 includes an example data interface(s) 452, an example database promoter 454, an example traffic controller 456, and an example power enabler/disabler 458. The components 410, 420, 430, 440, 450, 460 of the VA 320 may be implemented by one or more of the VMs 114. The example service provider 410 provides services to provision interfaces (e.g., Web interface, application interface, etc.) for the VA 320. In some examples, the service provider 410 includes a REST API (e.g., vCAC, vRA, vCloud Director, etc.) to provide the services to provide interfaces for the VA 320. Such services may include Tomcat Java Database Connectivity (JDBC) pool, Hibernate and Spring, etc. In some examples, the example service provider 410 includes a component registry that stores a listing (e.g., mapping) of the hierarchy and/or order or promotion of vAs for promoting a replica VA to a master VA in a cluster, as further described below. The example orchestrator (e.g., vCO or vRealize Orchestrator (vRO)) 420 is an embedded or internal orchestrator that can leverage a provisioning manager, such as the application director 106 and/or cloud manager 138, to provision VM services but is embedded in the VA 320. For example, the vCO 420 can be used to invoke a blueprint to provision a manager for services.

The example service provider 410, the example orchestrator 420, the example event broker 430, and/or the example authentication provider 440 generate services can including catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains (e.g., stores) information corresponding to installed and deployed services (e.g., uniform resource locators for services installed in a VM/VA, etc.) as well as a hierarchy and/or order of promotion of the example vAs 320, 322, 324, for example. The event broker provides a messaging broker for event-based communication, for example. The IaaS provisions one or more VMs and/or containers for a customer via the VA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between services with the orchestrator 420. The example event broker 430 may be an event drive extendibility engine that provides user interface-driven option for lifecycle automation. The event broker 430 may complete coverage of IaaS machine life cycle, approve policy with external systems, and notify external systems to configuration changes. The example authentication provider 440 (e.g., VMware Identity Manager Documentation services, etc.) is a web-based authentication server that authenticates and/or authorizes access to services and data (e.g., by providing web tokens for users to authenticate and/or authorize vRA services).

The components of the VA 320 access each other through REST API calls behind the internal reverse proxy 450 (e.g., a high availability (HA) proxy HAProxy which provides a high availability load balancer and proxy for Transmission Control Protocol (TCP)- and Hypertext Transfer Protocol (HTTP)-based application requests (e.g., an HTTP connector to HTTP-based application requests related to the example services 410, 420, 430, 440 and a TCP connector for TCP-based application requests related to the example database server 450). The HTTP connector provides an HTTP entry point to get VA services for each VA 320, 330, 340 and the TCP connector provides a TCP entry point to the example database server 450. The entry points are defined in a pool of the example load balancer 310 for vRA. In some examples, the proxy 450 may include more than one proxies and/or more than one data interface(s) 452. For example, the proxy 450 may include a first proxy and/or data interface for TCP-based application requests and a second proxy and/or data interface for HTTP-based application requests. In this example, the data interface(s) 452 forwards communication traffic from within the VA 320 and/or between vAs 320, 322, 324 of FIG. 3 to the appropriate component(s) of the VA 320 based on a FrontEnd and/or a BackEnd. As used herein, FrontEnd is the transmission of data from the example proxy 450 to a proxy of a master VA and BackEnd is the transmission of data from the example proxy 450 to the other internal components of the VA (e.g., the example service provider 410, the example orchestrator 420, the example event broker 430 the example authentication provider 440, and/or the example database server 460). Additionally, the example proxy 450 acts as an access point for a consumer of the database 460 to contact the database 460. In some examples, services access the local host/proxy 450 on a particular port, and the call is masked by the proxy 450 and forwarded to the particular component of the VA 320. Since the call is masked by the proxy 450, components can be adjusted within the VA 320 without impacting outside users.

The example database server 460 stores data corresponding to service traffic corresponding to read and/or write transactions generated by the example components 410, 420, 430, 440) forwarded to it via the example data interface(s) 452 of the example proxy 450. In some examples, the example database server 460 is a PostgreSQL server (PG).

When a service needs to use the example database server 460 of the example VA 320, the example traffic controller of the example proxy 450 redirects to the example database server 460 using a TCP. As described above in conjunction with FIG. 3, the example installation 300 may include multiple virtual appliances (e.g., the example virtual appliances 320, 322, 324). In some examples, such as highly availability, a first VA (e.g., VA 320) may include a database server (e.g., the example database server 460) that is a master database. A master database manages all other nodes (e.g., example vAs 322, 324) via the example proxy 450. Traffic within the cluster (e.g., the example vAs 322, 324, 326) is forwarded to the master database server. In such examples, the other vAs (e.g., vAs 322, 324) may be replica databases that are backups to the master database (e.g., streaming replication to the master database directly via an internal data transfer between database nodes). In this manner, if the master database goes down due to some error (e.g., failover) or maintenance, one of the replica databases can be available for use as a master database. Failover occurs when a master database server (e.g., the example database server 460) is powered down by the example power enabler/disabler 458, thereby causing services generated by the example service provider 410, the example orchestrator 420, the example event broker 430, and/or the example authentication provider 440, to lose read/write access to the master database. As further explained below, when a master database goes down (e.g., intentionally or unintentionally), the example database promoter 545 can promote the database server 460 from a replica database to be a new master (e.g., the example proxy 450 of each example VA 320, 330, 340 is reconfigured so that replica VA (Virtual Appliances) point to the new master as a leading node). In this manner, all services continue working (e.g., services are not affected) through the promoted database (e.g., the new master) transparently and smoothly without any configuration change by forwarding traffic to the newly promoted master. In this manner, a user does not need to change a URL connection string for the database because operation uses the same connection (e.g., pointing to the localhost proxy) and while a proxy is reloaded underneath. An example of a master-replica transition during failover is further described in conjunction with FIG. 5. An example of a master-replica transition during database maintenance is further described in conjunction with FIG. 6.

While an example manner of implementing the example VA 320 FIG. 3 is illustrated in FIG. 4, one or more of the elements, processes and/or devices illustrated in FIG. 4 may be combined, divided, re-arranged, omitted, eliminated and/or implemented in any other way. Further, the example service provider 410, the example orchestrator, the example event broker 430, the example authentication provider 440, the example proxy 450, the example data interface(s) 452, the example database promoter 454, the example traffic controller 456, the example power enabler/disabler 458, the example database server 460, and/or, more generally, the example VA 320 FIG. 4 can be implemented by hardware, software, firmware and/or any combination of hardware, software and/or firmware. Thus, for example, any of the example service provider 410, the example orchestrator, the example event broker 430, the example authentication provider 440, the example proxy 450, the example data interface(s) 452, the example database promoter 454, the example traffic controller 456, the example power enabler/disabler 458, the example database server 460, and/or, more generally, the example systems VA 320 of FIG. 4 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example service provider 410, the example orchestrator, the example event broker 430, the example authentication provider 440, the example proxy 450, the example data interface(s) 452, the example database promoter 454, the example traffic controller 456, the example power enabler/disabler 458, the example database server 460, and/or, more generally, the example VA 320 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example service provider 410, the example orchestrator, the example event broker 430, the example authentication provider 440, the example proxy 450, the example data interface(s) 452, the example database promoter 454, the example traffic controller 456, the example power enabler/disabler 458, the example database server 460, and/or, more generally, the example VA 320 of FIG. 4 may include one or more elements, processes and/or devices in addition to, or instead of, those illustrated in FIG. 4, and/or may include more than one of any or all of the illustrated elements, processes and devices.

Flowcharts representative of example machine readable instructions that may be executed to deploy and manage the example service provider 410, the example orchestrator, the example event broker 430, the example authentication provider 440, the example proxy 450, the example data interface(s) 452, the example database promoter 454, the example traffic controller 456, the example power enabler/disabler 458, the example database server 460, and/or, more generally, the example VA 320 of FIG. 4 are shown in FIGS. 7-10. In these examples, the machine readable instructions implement programs for execution by a processor such as the processor 1112 shown in the example processor platform 1100 discussed below in connection with FIG. 11. The programs may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIGS. 7-10, many other methods of deploying, evaluating, and installing services on component servers in accordance with the teachings of this disclosure may alternatively be used. For example, the order of execution of the blocks may be changed, and/or some of the blocks described may be changed, eliminated, or combined.

As mentioned above, the example processes of FIGS. 7-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 7-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 5:
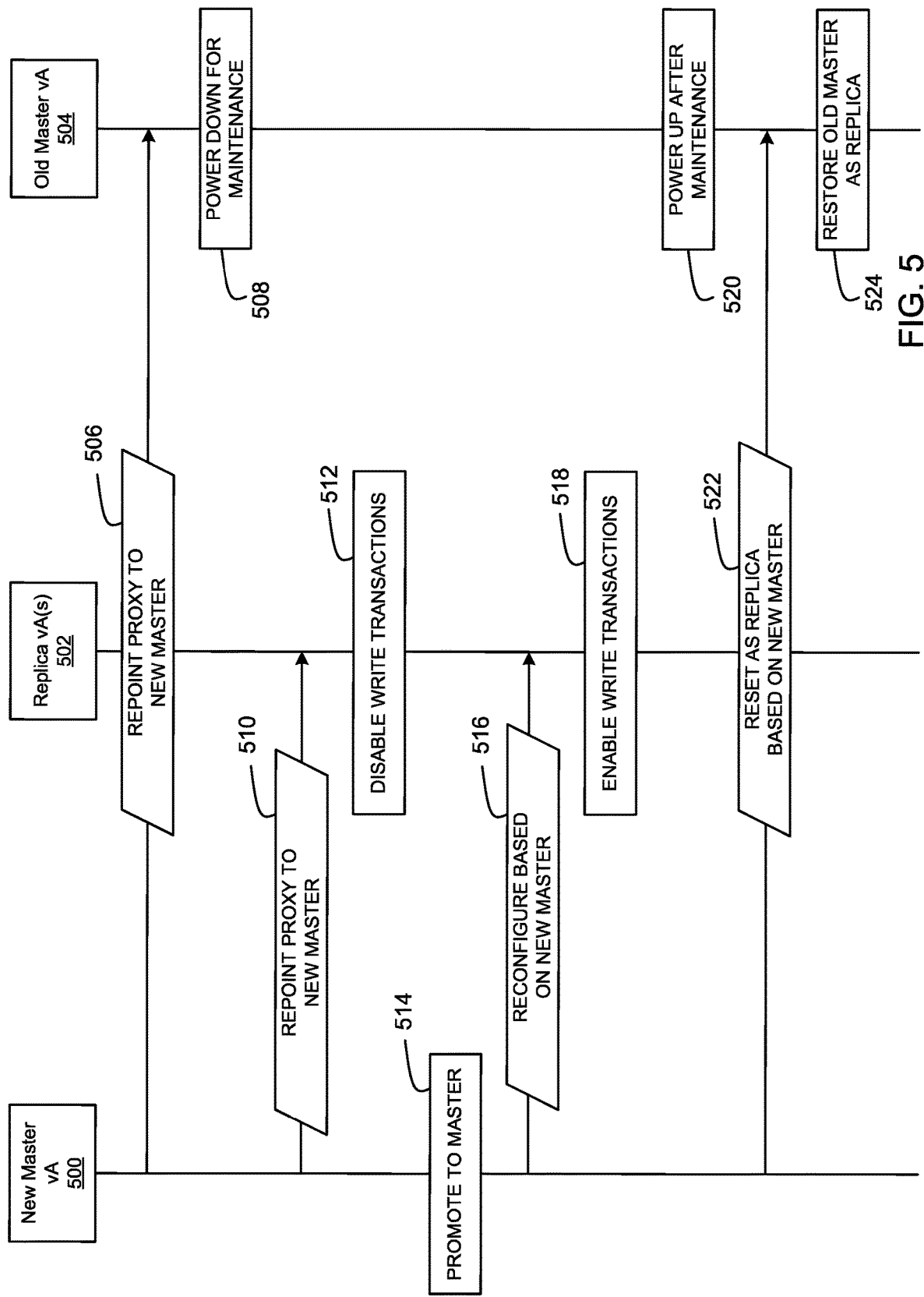
FIG. 5 is an example data flow diagram showing an exchange of information between a new master database, replica database(s), and an old master database during failover.

FIG. 5 is an example data flow diagram showing an exchange of information between an example new master VA 500, an example replica VA(s) 502, and an example old master VA 504 during failover. The example new master VA 500, the example replica VA 502, and the example old master VA 504 are described in conjunction with the example VA 320 of FIG. 4. As explained above in conjunction with FIG. 4, the example database server 460 may operate in master mode or in replica mode during a promotion. The example new master VA 500 corresponds to a VA whose database server transitions from replica mode to master mode. The example replica VA 502 corresponds to a VA whose database server is operating in replica mode. The example old master VA 504 corresponds to a VA whose database server powers down for maintenance.

When the example old master VA 504 fails (e.g., requires a reboot, cannot operate properly, and/or otherwise requires maintenance), the example database promoter 454 and/or a user (e.g., via the example load balancer 310) selects a replica database to replace the old master VA 504 as a master database for the cluster of vAs (e.g., the example vAs 320, 322, 324). In some examples, the order of promotion of a new master is stored in a component registry of the example service provider 410 of FIG. 4. The order of promotion may be based on VA health, VA capacity, a hierarchy of VA, user and/or manufacturer preferences, and/or any other characteristics. In this manner, when the example old master VA 504 fails, the remaining vAs 500, 502 have a record of who should be selected to be the new master VA. In the illustrated example of FIG. 5, the example database promoter 454 and/or user selects the example new master VA 500 to replace of the old master 504. The example new master VA 500 may determine that the old master VA 504 is failing based on an error signal or alert received by the example proxy 450 of FIG. 4.

To initiate the promotion of the new master VA 500, the new master VA 500 transmits example "repoint proxy to new master" instructions 506 via the example proxy 450 to the example old master VA 504. The example "repoint proxy to new master" instructions 506 indicate, to the old master 504, that the example new master VA 500 will be promoted from a replica to a master. At block 508, in response to receiving the example "repoint proxy to new master" instructions 506, part or all of the example old master VA 504 powers down for maintenance (e.g., the example database server 460). Additionally, the example new master VA 500 transmits example "repoint proxy to new master" instructions 510 to the other replica VA(s) 502. The example "repoint proxy to new master" instructions 506 indicate, to the replica VA(s) 502, that the database server 460 of the example new master VA 500 has been promoted from a replica database to a master database. At block 512, in response to receiving the example "repoint proxy to new master" instructions 510, the example replica VA(s) 502 disables service track corresponding to write transactions of services to the database of the example old master VA 504, to give the example new master VA 500 time to promote and reconfigure the example database server from replica mode to master mode.

At block 514, the example new master VA 500 promotes the example database server 460 by reconfiguring the database server 460 from replica mode (e.g., streaming replication to the master node) to master mode (e.g., managing the replica nodes). Once the new master VA 500 promotes the example database server 460 to a master database, the example new master VA 500 transmits "reconfigure based on new master" instructions 516 to the example replica VA(s) 502. At block 518, once the example replica VA(s) 502 receive the "reconfigure based on new master" instructions 516 from the example new master VA 500, the example replicas enable service to execute service traffic corresponding to write transactions to the database (e.g., the example database server 460) of the new master VA 500 by reconfiguring the proxies of the example replica VA(s) 502 to utilize the example database server of the new master VA 500 as the master of the cluster.

At block 520, after maintenance of the example old master VA 504 is complete, the example old master VA 504 powers up. The example new master VA 500 may determine that the example old master VA 504 is powered back on based on a communication from the example old master VA 504 and/or the example load balancer 310 of FIG. 3. Once the example new master VA 500 determines that the old master VA 504 is powered back up, the example new master VA 500 transmits example "reset as replica based on new master" instructions 522 to the example old master VA 504. The instructions instruct the replica VA(s) 502 to no longer use the old master VA 504 as the master, but rather the new master VA 500 as the master. Accordingly, at block 524, the example old master VA 504 restores (e.g., resets) a database server of the old master VA 504 in replica mode to stream replication to the example new master VA 500. Alternatively, once powered back on, the example old master VA 504 may retain its master status in a similar manner as the example new master VA 500. In such examples, the new master VA 500 returns to a replica. An old master VA returning to master VA after being powered back on is herein referred as failback.

Figure 6:
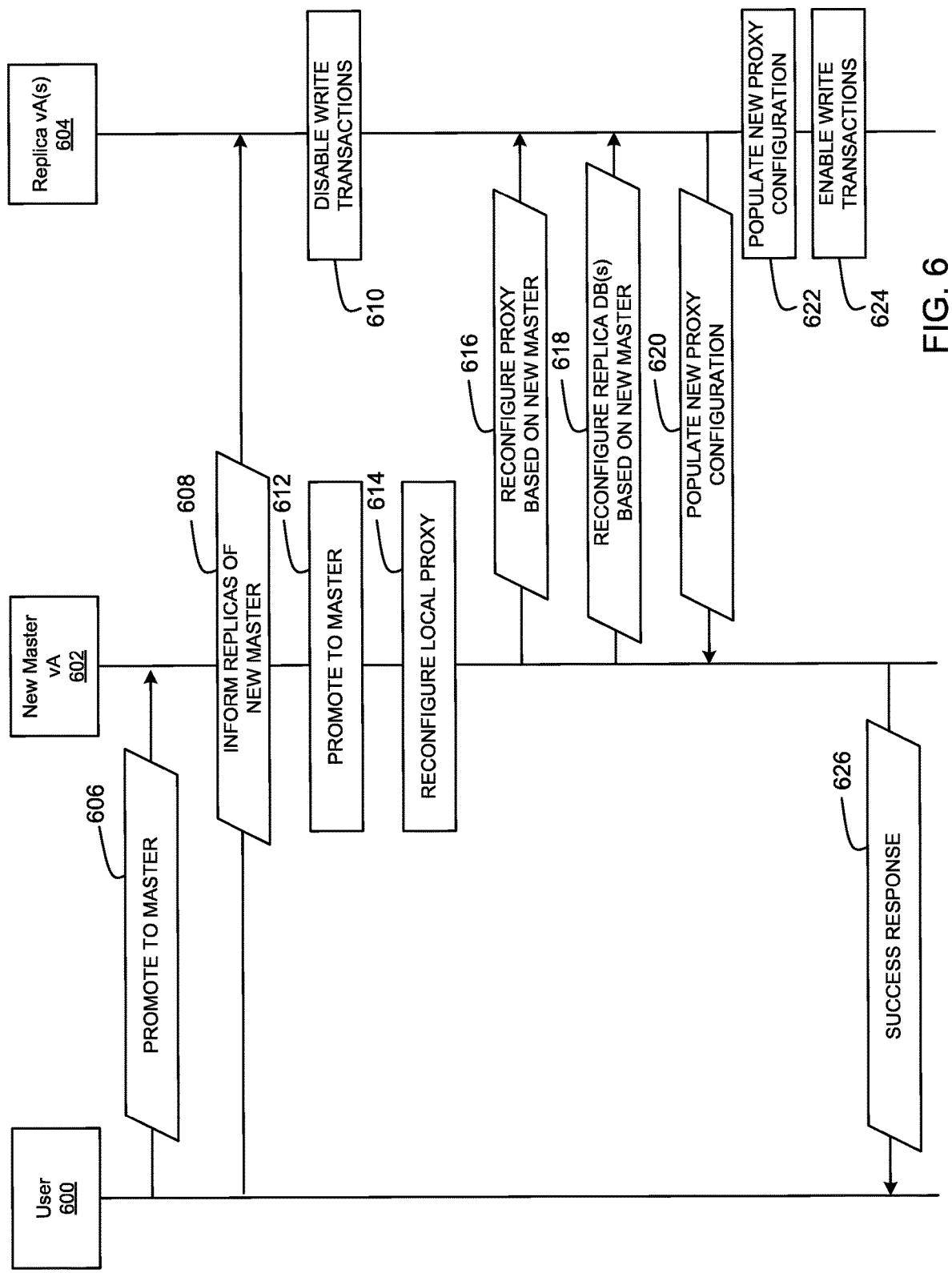
FIG. 6 is an example data flow diagrams showing an exchange of information between a user, a new master database, and replica database(s) during maintenance of one or more databases.

FIG. 6 is an example data flow diagram showing an example exchange of information between an example user 600, an example new master VA 602, and an example replica VA(s) 604 during maintenance of a master database. The example new master VA 500, the example replica VA 502, and the example old master VA 504 are described in conjunction with the example VA 320 of FIG. 4. As explained above in conjunction with FIG. 4, the example database server 460 may operate in master mode or in replica mode during a promotion. For example, the example new master VA 602 corresponds to a VA whose database server transitions from replica mode to master mode and the example replica VA 604 corresponds to a VA whose database server is operating in replica mode. The example user 600 may transmit maintenance instructions to the example vAs (e.g., the example new master VA 602 and/or the example replica VA 604) by interfacing with the example load balancer 310 of FIG. 3. Alternatively, the example load balancer 310 may transmit the instructions without the example user 600 (e.g., during a scheduled and/or triggered database maintenance).

When maintenance of a master database is to occur, the example user 600 transmits "promote to master" instructions 606 to the example new master VA 602 via the example load balancer 310 to instruct the example new master VA 602 to transition its database server (e.g., the example database server 460) from a replica database to a master database of the cluster of vAs. In some examples, the order of promotion of a new master is stored in a component registry of the example service provider 410 of FIG. 4. The order of promotion may be based on VA health, VA capacity, a hierarchy and/or order or promotion of VA, preferences of the example user 600 and/or a manufacturer, and/or any other characteristics. Additionally, the example user 600 transmits example "inform replicas of new master" instructions 608 to the example replica VA(s) 604. The example "inform replicas of new master" instructions 608 indicate, to the replica VA(s) 502, that the example new master VA 500 will be promoted from a replica to a master. At block 610, in response to receiving the example "inform replica of new master" instructions 510, the example replica VA(s) 604 disables service traffic corresponding to write transactions of services to the database of the failed master (e.g., the example old master VA 504), to give the example new master VA 602 time to promote and reconfigure from replica mode to master mode.

At block 612, the example new master VA 500 promotes the example database server 460 by reconfiguring the database server 460 from replica mode (e.g., streaming replication to the master node) to master mode (managing the replica nodes). Additionally, the example new master VA 602 reconfigures its local internal proxy (e.g., the example proxy 450) to operate as a master (e.g., managing the example replica vAs 604). Once the new master VA 500 promotes the example database server 460 to a master database and reconfigures the example proxy 450, the example new master VA 602 transmits "reconfigure proxy based on new master" instructions 616 and reconfigure replica database(s)) instructions 618 to the example replica VA(s) 604. In some examples, the "reconfigure proxy based on new master" instructions 616 include a configuration of the cluster without the old master VA that is currently down which may be stored in a component registry of the example service provider 410. In this manner, the example cluster (e.g., including the example new master VA 602 and the example replica VA(s) 604) operates without the VA currently under maintenance. In response to receiving the reconfigure instructions 616, 618, the example replica VA(s) 604 transmit "populate new proxy configuration" instruction 620 indicating that the proxy of the example replica VA(s) 604 will operate based on the example new master VA 602.

At block 622, the example replica VA(s) 604 populates the internal reverse proxy (e.g., the example proxy 450) of the example replica VA(s) 604 with the new proxy configurations based on the new master VA 602 (e.g., to reconfigure the proxies of the example replica VA(s) 604 to utilize the example database server of the new master VA 602 as the master of the cluster). At block 624, once the example replica VA(s) 502 populate their proxy using the new proxy configuration, the example replicas enable service traffic corresponding to write transactions of services to the database of the new master VA 500. In response to receiving the example populate new proxy instructions 620, the example new master VA 602 transmits the example success response 626 to the example user 600 indicating that the transition of the example new master VA 602 from a replica to a master is complete. In some examples, once maintenance of the old master VA is complete, the old master VA may retain its master status in a similar manner as the example new master VA 500 (e.g., failback). In such examples, the new master VA 602 returns to a replica.

Figure 7:
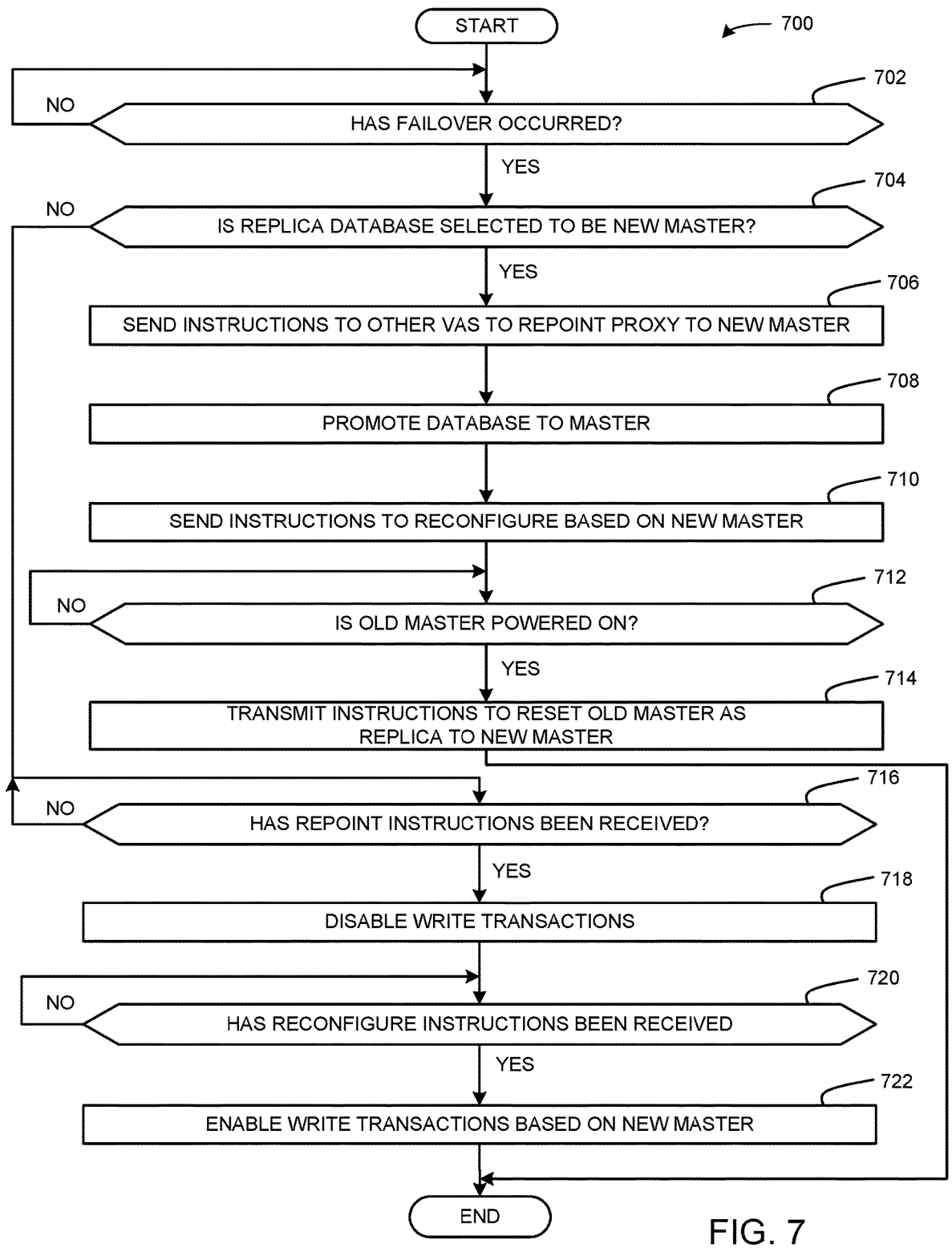
FIGS. 7-10 depict flowcharts representative of computer readable instructions that may be executed to implement the virtual application of FIGS. 3-4 in accordance with the teachings of the disclosure.

FIG. 7 depicts a flowchart representative of computer readable instructions that may be executed to implement the example VA 320 of FIGS. 3 and 4 operating in replica mode during failover (e.g., such as the example new master VA 500 and/or the example replica VA(s) 502 of FIG. 5). An example program 700 is illustrated in FIG. 7. The example program 700 is described in conjunction with the example VA 320 of FIG. 3 and the example flow diagram of FIG. 5.

Initially, at block 702, the example data interface(s) 452 of the example proxy 450 (e.g., corresponding to the replica VA 502) determines if failover has occurred. As described above in conjunction with FIG. 5, the example proxy 450 may determine that a failover has occurred based on a signal and/or an alert from the example old master VA 504 and/or the example load balancer 310 of FIG. 3. If a failover has not occurred (block 702: NO), the example proxy 450 continues to operate the example replica VA 502 as a replica until a failover occurs.

If the failover has occurred (block 702: YES), the example database promoter 454 determines if the example database server 460 is selected to be the new master (block 704). The example database promoter 454 determines if the example database server 460 is selected to be the new master based on the order stored in a component registry of the example service provider 410 of FIG. 4. The selection of the new master may be based on VA health, VA capacity, a hierarchy and/or order or promotion of VA, user and/or manufacturer preferences, and/or any other characteristics. If the example database promoter 454 determines that the example database server 460 is selected to be the new master (block 704: YES), the example data interface(s) 452 transmits instructions (e.g., the example "repoint proxy to new master" instructions 506 of FIG. 5) to the other vAs (e.g., the example replica vAs 502) of the cluster to repoint the proxy 450 of the example VA 320 to the new master (e.g., the example new master VA 500) (block 706).

At block 708, the example database promoter 454 promotes the example database server 460 of the example VA 320 from replica to master. Promoting the example database server 460 from replica to master includes reconfiguring the example proxy 450 to point to the example database server 460 as a master node and communicate with the other proxy of other vAs to replica the example database server 460. At block 710, the example data interface(s) 452 transmits instructions (e.g., the example "reconfigure proxy based on new master" instructions 516 of FIG. 5) to reconfigure the other replica VA(s) (e.g., the example replica VA(s) 502) based on the example new master VA 500. At block 710, the data interface(s) 452 determines if the old master VA 504 is powered back up after maintenance. The example data interface(s) 452 may determine that the old master 504 is powered up based on a signal and/or alert from the example old master VA 504 and/or the example load balancer 310 of FIG. 3. If the example data interface(s) 452 determines that the old master VA 504 is not powered up (block 712: NO), the example data interface(s) 452 continues to wait until the example old master VA 504 is powered up. If the example data interface(s) 452 determines that the old master VA 504 is powered up (e.g., block 712: YES), the example data interface(s) 452 transmits instructions (e.g., the example "reset as replica based on new master" instructions 522 of FIG. 5) to reset the example old master VA 504 as a replica VA to the example new master VA 500.

Returning to block 704, if the example database promoter 454 determines that the replica database (e.g., the example database server 460) is not selected to be a new master database (block 704: NO), the example data interface(s) 452 determines if the repoint instructions (e.g., the example "repoint proxy to new master" instructions 510 of FIG. 5) have been received (block 716). If the example data interface(s) 452 determines that the repoint instructions have not been received (block 716: NO), the example data interface(s) 452 continues to wait until the repoint instructions have been received. If the example data interface(s) 452 determines that the repoint instruction have been received (block 716: YES), the example traffic controller 456 transmits instructions via the data interface(s) 452 to the example service provider 410, the example orchestrator 420, the example event broker 430, the example authentication provider 440, and/or the example database server 460 to disable service traffic corresponding to write transactions (e.g., operating under read only mode) intended for the database of the old master VA 504 (block 718).

At block 720, the example data interface(s) 452 determines if reconfigure instructions (e.g., the example "reconfigure proxy based on new master" instructions 516 of FIG. 5) have been received. If the example data interface(s) 452 determines that the reconfigure instructions have not been received (block 270: NO), the example traffic controller 456 continues to operate the example VA 320 (e.g., the example replica VA 502) continues to operate in read only mode. If the example data interface(s) 452 determines that the reconfigure instructions have been received (block 270: YES), the example traffic controller 456 transmits instructions via the example data interface(s) 452 to the example service provider 410, the example orchestrator 420, the example event broker 430, the example authentication provider 440, and/or the example database server 460 to enable service traffic corresponding to write transaction for the database server of the new example master VA 500 (e.g., forwarding traffic to the new example master VA 500).

Figure 8:
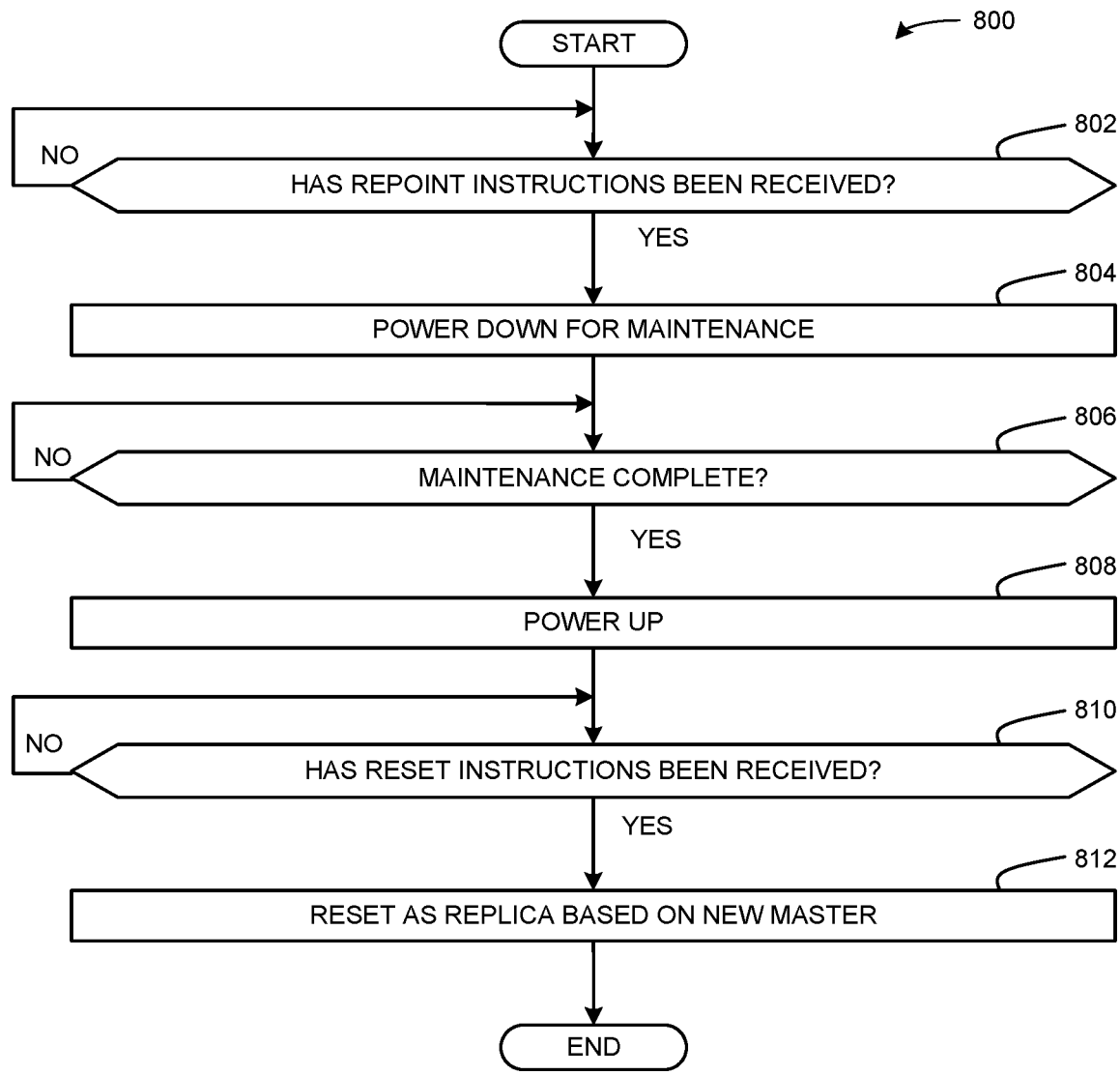

FIG. 8 depicts a flowchart representative of computer readable instructions that may be executed to implement the example VA 320 of FIGS. 3 and 4 operating in master mode during failover (e.g., such as the example old master VA 504 of FIG. 5). An example program 800 is illustrated in FIG. 8. The example program 800 is described in conjunction with the example VA 320 of FIG. 3 and the example flow diagram of FIG. 5.

At block 802, when a database server (e.g., the example database server 460) is experiencing an error causing failover, the example data interface(s) 452 of the old master VA 504 determines if repoint instructions (e.g., the example "repoint proxy to new master" instructions 506 of FIG. 5) have been received. As described above in conjunction with FIG. 5, the example "repoint proxy to new master" instructions 506 indicate that the example new master VA 500 will be promoted and that the old master VA 504 may power down for maintenance. If the example data interface(s) 452 has not received repoint instructions from the example new master VA 500 (block 802: NO), the example proxy 450 of the example VA 320 (e.g., the example old master VA 504) maintains operation until the instructions are received. If the data interface(s) 452 has received repoint instructions from the example new master VA 500 (block 802: YES), the example power enabler/disabler 458 powers down the example service provider 410, the example orchestrator 420, the example event broker 430 the example authentication provider 440, and/or the example database server 460 of the example VA 320 (e.g., the example old master VA 504) for maintenance (block 804).

At block 806, the example data interface(s) 452 determines if the maintenance is complete. In some examples, the example data interface(s) 452 may determine that the maintenance is complete based on a communication (e.g., a signal or alert) from the example load balancer 310 of FIG. 3. If the example data interface(s) 452 determines that the maintenance is not complete (block 806: NO), the example data interface(s) 452 continues to wait until it receives an indication that the maintenance is complete. If the example data interface(s) 452 determines that the maintenance is complete (block 806: YES), the example power enabler/disabler 458 powers up the example service provider 410, the example orchestrator 420, the example event broker 430 the example authentication provider 440, and/or the example database server 460 of the example old master VA 504 after maintenance (block 808).

At block 810, the example data interface(s) 452 determines if reset instructions (e.g., the example "reset as replica based on new master" instructions 522) have been received. As described above in conjunction with FIG. 5, the reset instructions inform the example old master VA 504 that it should operate in replica mode based on the example new master VA 500. If the example data interface(s) 452 has not received the reset instructions (block 810: NO), the example data interface(s) 452 waits until the reset instructions are received. If the example data interface(s) 452 has received the reset instructions (block 810: YES), the example database promoter 454 instructs the example service provider 410, the example orchestrator 420, the example event broker 430 the example authentication provider 440, the example proxy 450, and/or the example database server 460 to reset in replica mode based on the example new master VA 500 (block 812). Alternatively, the example old master VA 504 may perform a failback to regain its status as the master VA (e.g., failback).

Figure 9:
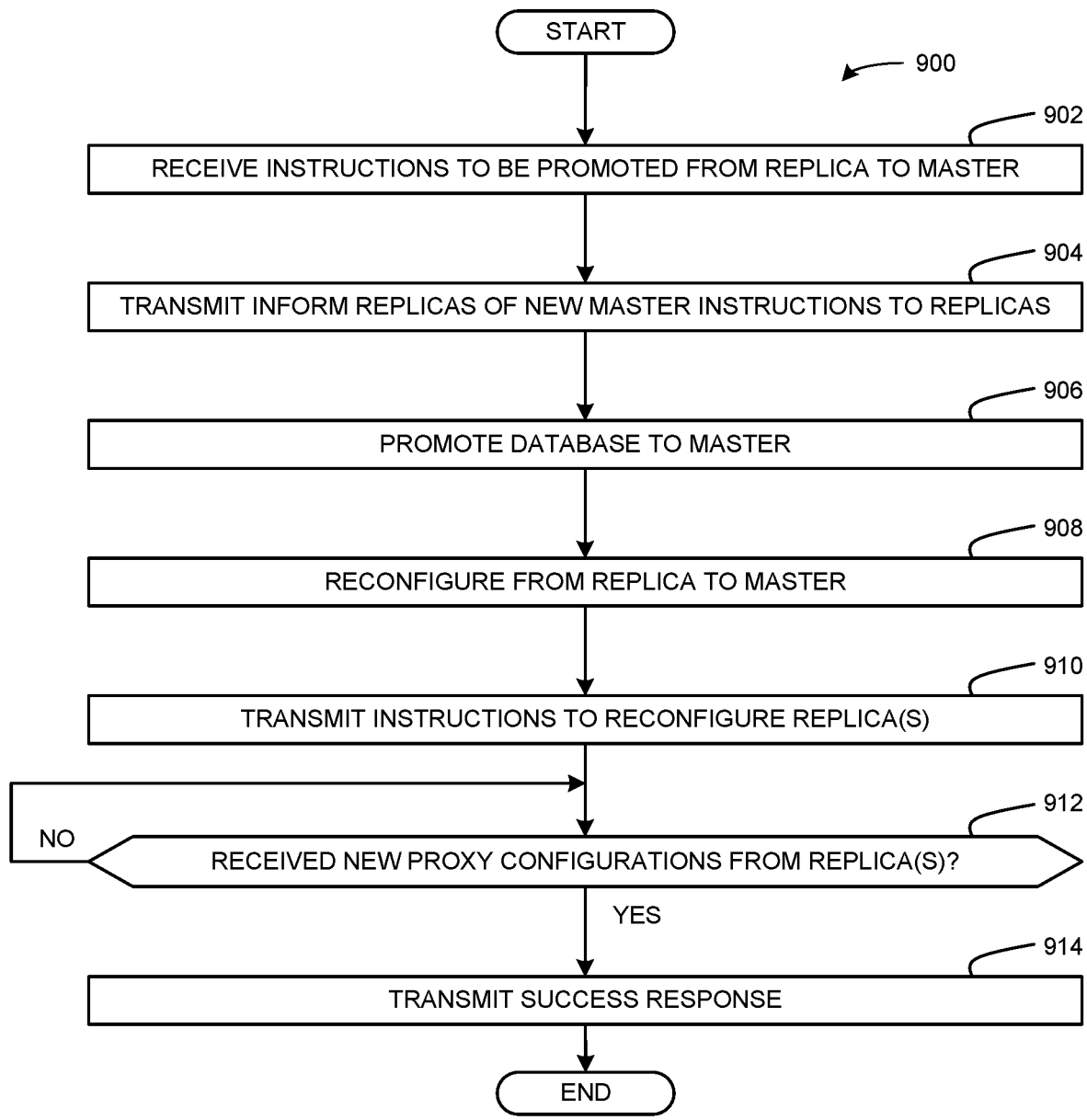

FIG. 9 depicts a flowchart representative of computer readable instructions that may be executed to implement the example VA 320 of FIGS. 3 and 4 (e.g., such as the example new master VA 602 of FIG. 6) during maintenance of an old master VA. An example program 900 is illustrated in FIG. 9. The example program 900 is described in conjunction with the example VA 320 of FIG. 3 and the example flow diagram of FIG. 6.

Initially, at block 902, the example data interface(s) 452 of the example VA 320 (e.g., the example new master VA 602) receives instructions (e.g., the example "promote to master" instructions 606) to be promoted from a replica to a master via the example load balancer 310 of FIG. 3. As described above in conjunction with FIG. 6, when the example user 600 and/or the example load balancer 310 (FIG. 3) performs maintenance to a master VA, one of the replica vAs is temporality promoted to master (e.g., the example new master VA 602). The received instructions initiate the transition. At block 904, the example user 600 (via an interface connected to the example load balancer 310) or load balancer 310 transmits inform replica instructions (e.g., the example "inform replicas of new master" instructions 608) to the example replica VA(s) 604. Alternatively, the data interface(s) 452 of the example new master VA 602 may transmit the example "inform replicas of new master" instructions 608 to the example replica VA(s) 604.

At block 908, the example database promoter 454 of the example VA (e.g., the example new master VA 602) reconfigures from replica to master. As described above in conjunction with FIG. 4, the example database promoter 454 reconfigures by reconfiguring the example data interface(s) 452 to operate the example database server 460 as a master (e.g., a leading node for all other replica database servers of other vAs. At block 910, the example data interface(s) 452 transmits instructions (e.g., the example "reconfigure proxy based on new master" instructions 616 and/or the example reconfigure replica database(s) based on new master instructions 618 of FIG. 6) to reconfigure the example replica VA(s) 604. In this manner, the example replica(s) vAs 604 will reconfigure to be replicas of the new master VA 602 while the old master VA is powered down for maintenance.

At block 912, the example data interface(s) 452 of the example VA 320 (e.g., the example new master VA 602) determines if new proxy configuration instructions (e.g., the example "populate new proxy configuration" instructions 620) have been received from the replica VA(s) 604. As described above in conjunction with FIG. 6, the new proxy configuration instructions indicate that the replica VA(s) 604 has received the instructions to reconfigure based on the example new master VA 602. If the example data interface(s) 452 determines that the new proxy configuration instructions have not been received (block 912: NO), the example data interface(s) 452 waits until the new proxy configuration instructions have been received. If the example data interface(s) 452 determines that the new proxy configuration instructions have been received (block 912: YES), the example data interface(s) 452 transmits a success response (e.g., the example success response 626) to the example user 600 and/or the example load balancer 310 of FIG. 3.

Figure 10:
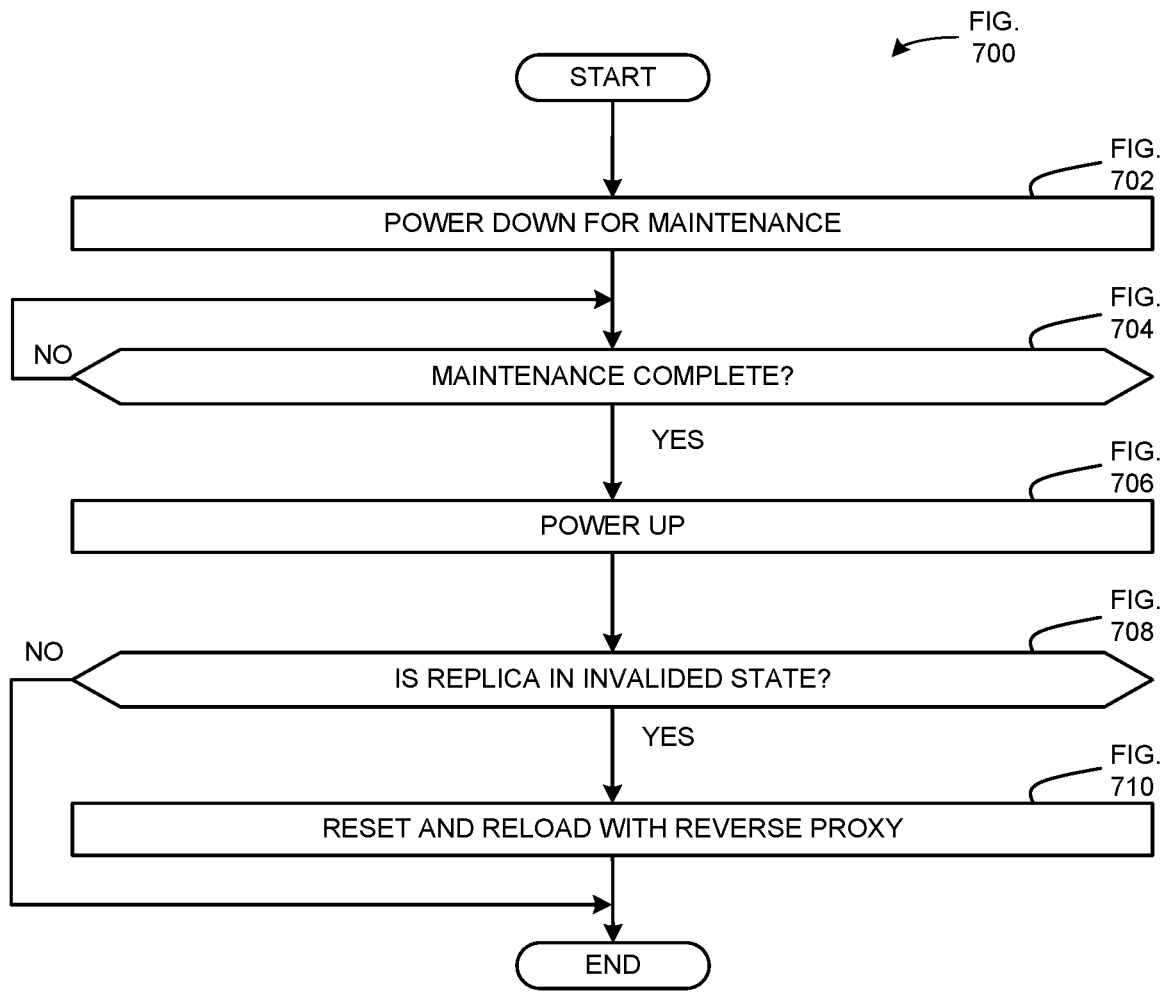

FIG. 10 depicts a flowchart representative of computer readable instructions that may be executed to implement the example VA 320 of FIGS. 3 and 4 (e.g., such as the example replica VA 604 of FIG. 6) during maintenance. An example program 1000 is illustrated in FIG. 10. The example program 1000 is described in conjunction with the example VA 320 of FIG. 3 and the example flow diagram of FIG. 6.

Initially, at block 1002, the example power enabler/disabler 458 instructs the example service provider 410, the example orchestrator 420, the example event broker 430 the example authentication provider 440, and/or the example database server 460 of the example replica VA 604 to power down for maintenance. At block 1004, the example data interface(s) 452 of the example VA 320 (e.g., the example replica VA 604) determines if maintenance is complete. In some examples, the example data interface(s) 452 may determine that the maintenance is complete based on a communication (e.g., a signal or alert) from the example load balancer 310 of FIG. 3. If the example data interface(s) 452 determines that the maintenance is not complete (block 1004: NO), the example data interface(s) 452 continues to wait until it receives an indication that the maintenance is complete. If the example data interface(s) 452 determines that the maintenance is complete (block 1004: YES), the example power enabler/disabler 458 instructs the example service provider 410, the example orchestrator 420, the example event broker 430 the example authentication provider 440, and/or the example database server 460 of the example replica VA 604 to power up after maintenance (block 1006).

At block 1008, the example traffic controller 456 of the example VA 320 corresponding to the example replica VA 604 determines if the replica VA 604 is in an invalid state. In some examples, the traffic controller 456 determines that the replica VA 604 is in an invalid state by running diagnostics and/or monitoring on the example components (e.g., the example service provider 410, the example orchestrator 420, the example event broker 430 the example authentication provider 440, the example proxy 450, and/or the example database server 460) of the example VA 604. If the example traffic controller 456 determines that the replica VA 604 is in an invalid state, the example traffic controller 456 resets the components of the example VA 604 and just the reverse proxy configuration is reloaded (block 1010).

Figure 11:
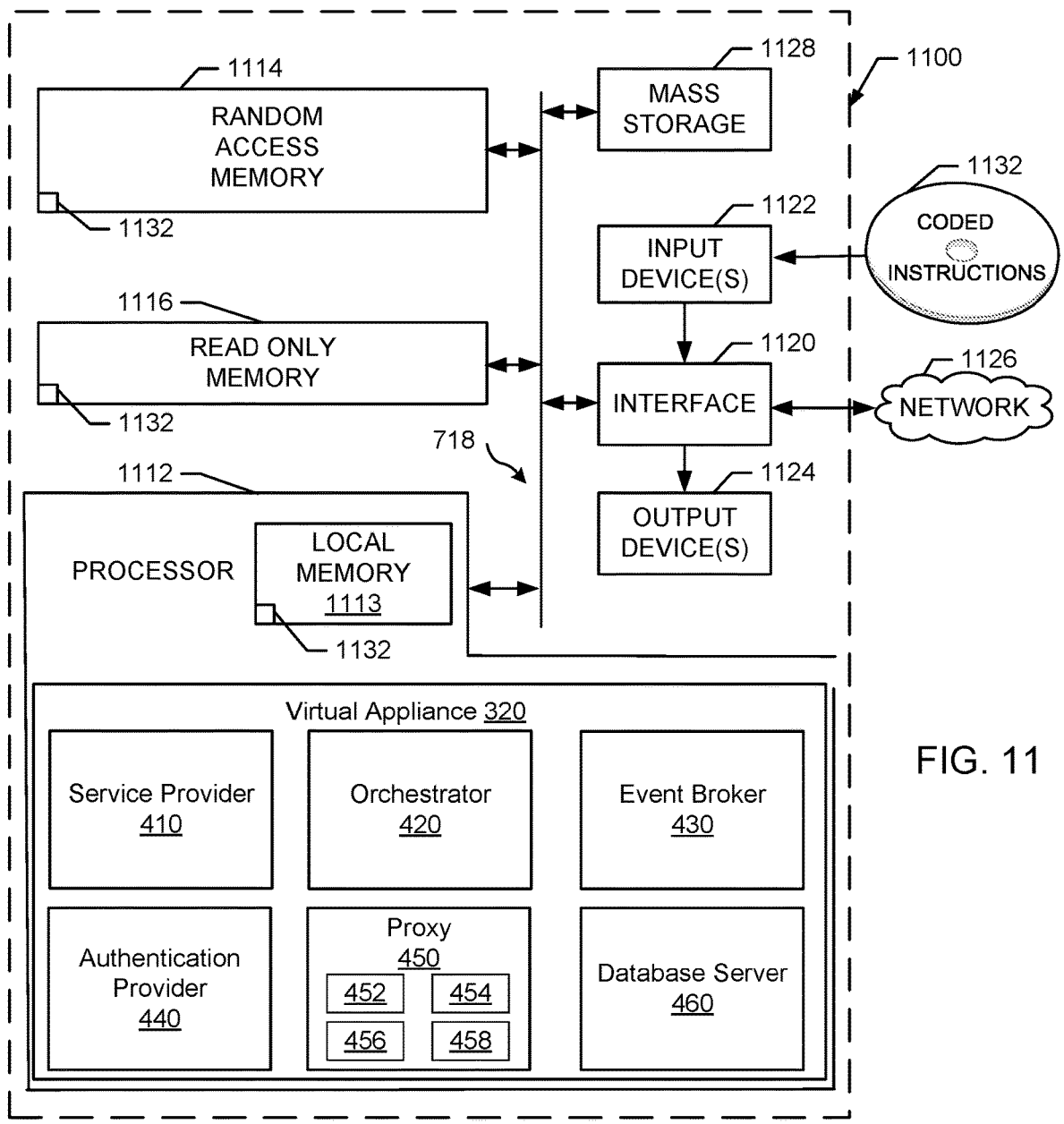
FIG. 11 is a block diagram of an example processing platform capable of executing the example machine-readable instructions of FIGS. 7-10 to implement the virtual applicant of FIG. 4 in accordance with the teachings of the disclosure.

FIG. 11 is a block diagram of an example processor platform 1100 capable of executing the instructions of FIGS. 7-10 to implement the example systems, operation, and management of FIGS. 1-4. The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache), and executes instructions to implement the example VA 320 or portions thereof, such as the example service provider 410, the example orchestrator, the example event broker 430, the example authentication provider 440, the example proxy 450, the example data interface(s) 452, the example database promoter 454, the example traffic controller 456, the example power enabler/disabler 458, and/or the example database server 460. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAIVIBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include flash devices, floppy disk drives, hard drive disks, optical compact disk (CD) drives, optical Blu-ray disk drives, RAID systems, and optical digital versatile disk (DVD) drives.

Coded instructions 1132 representative of the example machine readable instructions of FIGS. 7-10 may be stored in the mass storage device 1128, in the volatile memory 1114, in the non-volatile memory 1816, and/or on a removable tangible computer readable storage medium such as a CD or DVD.

In certain examples, the processor 1112 can be used to implement the virtual appliance 320 (and vAs 322-324) and the component server 330 (and servers 332-336) and their components including the service provider 410, orchestrator 420, event broker 430, authentication provider 440, proxy 450, the data interface(s) 452, the database promoter 454, the traffic controller 456, the power enabler/disabler 458, the database server 460, management endpoint 340, etc. In certain examples, as discussed herein, the hardware of processor 1112 is virtualized using virtualization such as VMs and/or containers. In the example of FIG. 11, the virtual appliance 320 and/or the component server 330 can be implemented by one or more VMs or containers, so as to virtualize the hardware of processor 1112.

From the foregoing, it will be appreciated that the above disclosed methods, apparatus, and articles of manufacture perform transparent database switching using master-replica high availability setup in relational databases. Examples disclosed herein include a cluster of virtual appliances acting as hosts for deployment of component servers (e.g., Web server, application server, database server, etc.) for a customer. The cluster includes a master virtual appliance and one or more replica virtual appliances. Each virtual appliance includes an internal reverse proxy to communicate with internal and external components including a database server. The database server for the master appliance receives service traffic including read and write transactions from services associated with the cluster via the internal proxy. The database server of the replica appliance(s) streams the master database directly via an internal data transfer between database nodes to provide a backup database(s). Example disclosed herein include promoting a database server of a replica virtual appliance to a new master during failover and/or maintenance of the old master database. In this manner, all services continue working (e.g., services are not affected) through the promoted database (e.g., the new master) transparently and smoothly without any configuration change by forwarding traffic to the newly promoted master.

Traditional systems include an external proxy to provide load balancing and filter track between virtual appliances. However, such traditional systems require additional maintenance overhead for such external proxies. Additionally, such traditional systems do not have a strict dependency to an external database connection for the services. In this manner, if the master database is running on the same distributed node, there is no dependency at all. Examples disclosed herein, alleviate such problems by creating an internal proxy for each virtual application to provide dependency to the internal database and communicate with other internal proxies in a cluster to access other internal databases. In this manner, there is no separate node (e.g., proxy node) to maintain. Example internal proxies disclosed herein are light weight, stable, and, because it is accessed by serves on the localhost, there is no additional network overhead.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system for performing transparent database switching using master-replica high availability setup in relational databases in a virtual machine environment, the system comprising:
   a first virtual appliance including a first proxy and a first database in a master mode of operation, the first proxy to forward service traffic from the virtual machine environment to the first database, the first database to at least one of read data or write data based on the service traffic;
   a second virtual appliance including a second proxy and a second database in a replica mode of operation, the second proxy to:
      transmit service traffic between at least one component of the second virtual appliance and the first proxy; and
      in response to the first database of the first virtual appliance becoming unavailable, adjust the second database from the replica mode of operation to the master mode of operation; and
   a third virtual appliance including a third proxy and a third database in the replica mode of operation, the third database to replicate the first database, the third proxy to:
      transmit service traffic between at least one component of the third virtual appliance and the first proxy;
      determine data stored in the first database;
      in response to a first instruction from the second virtual appliance indicating the second database is to be altered from the replica mode of operation to the master mode of operation, the first instruction received at the third proxy, instruct a service provider of the third virtual appliance to disable write transactions to the first database and enable a read-only mode of operation;
      in response to a second instruction from the second virtual appliance to reconfigure the third proxy based on the second virtual appliance, the second instruction received at the third proxy, cause the third proxy to point to the second proxy, the second virtual appliance to be a leading node in the virtual machine environment, the third proxy to transmit service traffic between the at least one component of the third virtual appliance and the second proxy;
      in response to a third instruction from the second virtual appliance to reconfigure the third database based on the second virtual appliance, the third instruction received at the third proxy, replicate the second database at the third database; and
      after the second database is adjusted from the replica mode of operation to the master mode of operation, enable write transactions to the second database.

2. The system of claim 1, wherein the first database of the first virtual appliance powers down during at least one of failover or maintenance.

3. The system of claim 1, wherein the second proxy is to instruct the first database of the first virtual appliance to reset in the replica mode of operation when the first database of the first virtual appliance powers up.

4. The system of claim 1, wherein, after the first database of the first virtual appliance powers up, the first database of the first virtual appliance maintains the master mode of operation and the second database returns to the replica mode of operation.

5. The system of claim 1, wherein an order of adjustment is stored in a component registry of the service provider in at least one of the first virtual appliance, the second virtual appliance, or the third virtual appliance.

6. The system of claim 5, wherein the service provider is to generate the service traffic, the service traffic including at least one of a read transaction or a write transaction corresponding to one or more databases in the master mode of operation.

7. The system of claim 1, wherein the second proxy is to inform the third proxy of the adjustment of the second database of the second virtual appliance from the replica mode of operation to the master mode of operation.

8. The system of claim 7, wherein the third proxy is to reconfigure the third database based on the second database of the second virtual appliance.

9. The system of claim 1, wherein the first database of the first virtual appliance is to power down after the adjustment of the second database of the second virtual appliance to the master mode of operation.

10. A method for performing transparent database switching using master-replica high availability setup in relational databases in a virtual machine environment, the method comprising:
   forwarding, with a first proxy, service traffic from the virtual machine environment to a first database of a first virtual appliance in a master mode of operation, the first database to at least one of read data or write data based on the service traffic;
   transmitting, with a second proxy, the service traffic between at least one component of a second virtual appliance and the first proxy;
   in response to the first database of the first virtual appliance becoming unavailable, adjusting, with the second proxy, a second database of the second virtual appliance from a replica mode of operation to the master mode of operation;
   transmitting, with a third proxy, service traffic between at least one component of a third virtual appliance and the first proxy;
   determining, with the third proxy, data stored in the first database;
   in response to a first notification from the second virtual appliance indicating the second database is to be altered from the replica mode of operation to the master mode of operation, the first notification received at the third proxy, instructing a service provider of the third virtual appliance to disable write transactions to the first database and enter a read-only mode of operation;

in response to a second instruction from the second virtual appliance to reconfigure the third proxy based on the second virtual appliance, the second instruction received at the third proxy, causing the third proxy to point to the second virtual appliance as a leading node in the virtual machine environment, the third proxy to transmit service traffic between the at least one component of the third virtual appliance and the second proxy;

in response to a third instruction from the second virtual appliance to reconfigure a third database based on the second virtual appliance, the third instruction received at the third proxy, replicating the second database at the third database; and after the second database is adjusted from the replica mode of operation to the master mode of operation, enabling write transactions to the second database.

11. The method of claim 10, further including powering down the first database of the first virtual appliance during at least one of failover or maintenance.

12. The method of claim 10, further including instructing, with the second proxy, the first database of the first virtual appliance to reset in the replica mode of operation when the first database of the first virtual appliance powers up.

13. The method of claim 10, further including, after the first database of the first virtual appliance powers up, maintaining the master mode of operation in the first database of the first virtual appliance and returning the second database to the replica mode of operation.

14. The method of claim 10, further including storing an order of adjustment in a component registry of the service provider in at least one of the first virtual appliance, the second virtual appliance, or the third virtual appliance.

15. The method of claim 14, further including generating the service traffic, the service traffic including at least one of a read transaction or a write transaction corresponding to one or more databases in the master mode of operation.

16. The method of claim 10, further including informing, with the second proxy, the third proxy of the adjustment of the second database of the second virtual appliance to the master mode of operation.

17. The method of claim 16, further including reconfiguring, with the third proxy, the third database based on the second database of the second virtual appliance.

18. The method of claim 10, further including powering down the first database of the first virtual appliance after the adjustment of the second database of the second virtual appliance from the master mode of operation to the replica mode of operation.

19. A non-transitory computer readable storage medium comprising instructions which, when executed, cause a machine to at least:

forward, via a first proxy of a first virtual appliance, service traffic from a virtual machine environment to a first database of the first virtual appliance in a master mode of operation, the first database to at least one of read data or write data based on the service traffic;

transmit, via a second proxy of a second virtual appliance, the service traffic between at least one component of the second virtual appliance and the first proxy;

in response to unavailability of the first database of the first virtual appliance, adjust, via the second proxy, a second database of the second virtual appliance from a replica mode of operation to the master mode of operation;

transmit, via a third proxy of a third virtual appliance, service traffic between at least one component of the third virtual appliance and the first proxy;

determine, via the third proxy, data stored in the first database;

in response to a first notification from the second virtual appliance indicating the second database is to be altered from the replica mode of operation to the master mode of operation, the first notification received at the third proxy, instruct a service provider of the third virtual appliance to disable write transactions to the first database and enable a read-only mode of operation until a third database completes the adjustment;

in response to a second instruction from the second virtual appliance to reconfigure the third proxy based on the second virtual appliance, the second instruction received at the third proxy, cause the third proxy to point to the second virtual appliance as a leading node in the virtual machine environment and exclude the first virtual appliance from the virtual machine environment, the third proxy to transmit service traffic between the at least one component of the third virtual appliance and the second proxy;

in response to a third instruction from the second virtual appliance to reconfigure the third database based on the second virtual appliance, the third instruction received at the third proxy, replicate the second database at the third database; and after the second database is adjusted from the replica mode of operation to the master mode of operation, enable write transactions to the second database.

20. The non-transitory computer readable storage medium of claim 19, wherein the instructions which, when executed, cause the machine to power down the first database of the first virtual appliance during at least one of failover or maintenance.

21. The non-transitory computer readable storage medium of claim 19, wherein the instructions, when executed, cause the machine to instruct, via the second proxy, the first database of the first virtual appliance to reset in the replica mode of operation when the first database of the first virtual appliance powers up.

22. The non-transitory computer readable storage medium of claim 19, wherein the instructions, when executed, cause the machine to, after the first database of the first virtual appliance powers up, maintain the master mode of operation in the first database of the first virtual appliance and return the third database to the replica mode of operation.

23. The non-transitory computer readable storage medium of claim 19, wherein the instructions, when executed, cause the machine to store an order of adjustment in a component registry of the service provider in at least one of the first virtual appliance, the second virtual appliance, or the third virtual appliance.

24. The non-transitory computer readable storage medium of claim 23, wherein the instructions, when executed, cause the machine to generate the service traffic, the service traffic including at least one of a read transaction or a write transaction corresponding to one or more databases in the master mode of operation.

25. The non-transitory computer readable storage medium of claim 19, wherein the instructions, when executed, cause the machine to inform, via the second proxy, the third proxy of the adjustment of the second database of the second virtual appliance from the replica mode of operation to the master mode of operation.

26. The non-transitory computer readable storage medium of claim 25, wherein the instructions, when executed, cause the machine to reconfigure, via the third proxy, the third database based on the second database of the second virtual appliance.

27. The non-transitory computer readable storage medium of claim 19, wherein the instructions, when executed, cause the machine to power down the first database of the first virtual appliance after the adjustment of the second database of the second virtual appliance from the replica mode of operation to the master mode of operation.

28. The system of claim 5, wherein the order of adjustment is based on a health of at least one of the first virtual appliance, the second virtual appliance, or the third virtual appliance.

29. The system of claim 5, wherein the order of adjustment is based on a capacity of at least one of the first virtual appliance, the second virtual appliance, or the third virtual appliance.

30. The system of claim 5, wherein the order of adjustment is based on a hierarchy of at least one of the first virtual appliance, the second virtual appliance, or the third virtual appliance.

\* \* \* \* \*